United States Patent [19]

Silverbrook

[11] Patent Number: 5,479,205
[45] Date of Patent: Dec. 26, 1995

[54] VIDEO CAMERA/RECORDER/ANIMATOR DEVICE

[75] Inventor: Kia Silverbrook, Woollahra, Australia

[73] Assignees: Canon Kabushiki Kaisha, Tokyo, Japan; Canon Information Systems Research, New South Wales, Australia

[21] Appl. No.: 352,436

[22] Filed: Dec. 9, 1994

Related U.S. Application Data

[63] Continuation of Ser. No. 53,410, Apr. 28, 1993, abandoned.

[30] Foreign Application Priority Data

Apr. 29, 1992 [AU] Australia ................................. PL2144

[51] Int. Cl.⁶ .................................................. H04N 5/262
[52] U.S. Cl. ........................... 348/239; 348/589; 358/906
[58] Field of Search ..................................... 348/239, 584, 348/586; 358/906; H04N 5/262

[56] References Cited

U.S. PATENT DOCUMENTS

| | | | |
|---|---|---|---|
| 3,898,377 | 8/1975 | Fairbairn et al. | 348/589 X |
| 4,812,909 | 3/1989 | Yokobayashi et al. | 348/589 |
| 4,855,813 | 8/1989 | Russell et al. | 348/589 X |
| 4,999,719 | 3/1991 | Tozaki et al. | 358/906 X |
| 5,168,363 | 12/1992 | Kojima et al. | 358/906 X |
| 5,175,624 | 12/1992 | Hieda et al. | 358/906 X |
| 5,179,505 | 1/1993 | Matsuo | 358/906 X |

*Primary Examiner*—Victor R. Kostak
*Attorney, Agent, or Firm*—Fitzpatrick, Cella, Harper & Scinto

[57] ABSTRACT

A video camcorder is integrally provided with a real-time animation facility. In particular, a video camera and recorder includes a camera for providing a real-time image signal, an input for receiving animation image data representing at least one animated image and a processing device for selecting one animated image from the animation image data. A real-time processor, connected to the processing device, calculates object priorities for the selected animated image. A video switching device, connected to the real-time processor, combines the real-time image signal with the selected animated image in accordance with the object priorities to form a combined real-time image signal, and a recorder records the combined real-time image signal.

24 Claims, 3 Drawing Sheets

VIDEO CAMERA/RECORDER/ANIMATOR DEVICE

This application is a continuation of application Ser. No. 08/053,410 filed Apr. 28, 1993, now abandoned.

BACKGROUND FIELD OF THE INVENTION

The present invention relates to video camera/recorders, known in the art as "camcorders" and in particular discloses a camcorder which is integrally provided with a real-time animation facility.

SUMMARY OF THE INVENTION

In accordance with one aspect of the present invention there is disclosed a video camera and recorder comprising camera means for providing a real-time image signal, an input for animation image dam, processing means for selecting one animated image from said image data, real-time (RTO) processor means connected to said processor means for rendering said one animated image and video switch means connected to said RTO processor means and said real-time image signal for combining same with said render animated image to form a combined real-time image signal, and recorder means for recording said combined real-time image signal.

BRIEF DESCRIPTION OF THE DRAWINGS

A preferred embodiment of the present invention will now be described with reference to the drawings in which.

DETAILED DESCRIPTION OF THE PREFERRED EMBODIMENT

The present invention is a specific application of technology disclosed in:

(i) Australian Patent Application No. 38244/93 entitled "A Real-Time Object Based Graphics System," claiming priority from Australian Patent Application No. PL 2147 of 29 Apr. 1992;

(ii) Australian Patent Application No. 38270/93 entitled "Method and Apparatus for Filling an Object Based Rasterised Image," claiming priority from Australian Patent Application No. PL 2148 of 29 Apr. 1992;

(iii) Australian Patent Application No. 38242/93 entitled "Method and Apparatus for Providing Transparency in an Object Based Rasterised Image," claiming priority from Australian Patent Application No. PL 2153 of 29 Apr. 1992;

(iv) Australian Patent Application No. 38233/93 entitled "Object Sorting and Edge Calculation for Graphics Systems," claiming priority from Australian Patent Application No. PL 2156 of 29 Apr. 1992 and Australian Patent No. PL 2145 of 29 Apr. 1992;

(v) Australian Patent Application No. 38250/93 entitled "A Preprocessing Pipeline for RTO Graphics System," claiming priority from Australian Patent Application No. PL 2142 of 29 Apr. 1992;

(vi) Australian Patent Application No. 38246/93 entitled "Object Based Graphics Using Quadratic Polynomial Fragments," claiming priority from Australian Patent Application No. PL 2150 of 29 Apr. 1992; and (vii) Australian Patent Application No. 38239/93 entitled "Bezier Spline to Quadratic Polynomial Fragment Conversion," claiming priority from Australian Patent Application No. PL 2149 of 29 Apr. 1992. U.S. patent application Ser. No. 08/053,378, filed Apr. 28, 1993, entitled "A Preprocessing Pipeline for RTO Graphics System", claiming priority from Australian Patent Application No. PL2142, filed Apr. 29, 1992; U.S. patent application Ser. No. 08/053,219, filed Apr. 28, 1993, entitled "Object Based Graphics Using Quadratic Polynomial Fragments", claiming priority from Australian Patent No. PL2150, filed Apr. 29, 1992; and U.S. patent application Ser. No. 08/053,213, filed Apr. 28, 1993, entitled "Bezier Spline to Quadratic Polynomial Fragment Conversion", claiming priority from Australian Patent No. Pl2149, filed Apr. 29, 1992, all lodged by the present applicant, the disclosure of each of which is hereby incorporated by reference.

Figure 1:
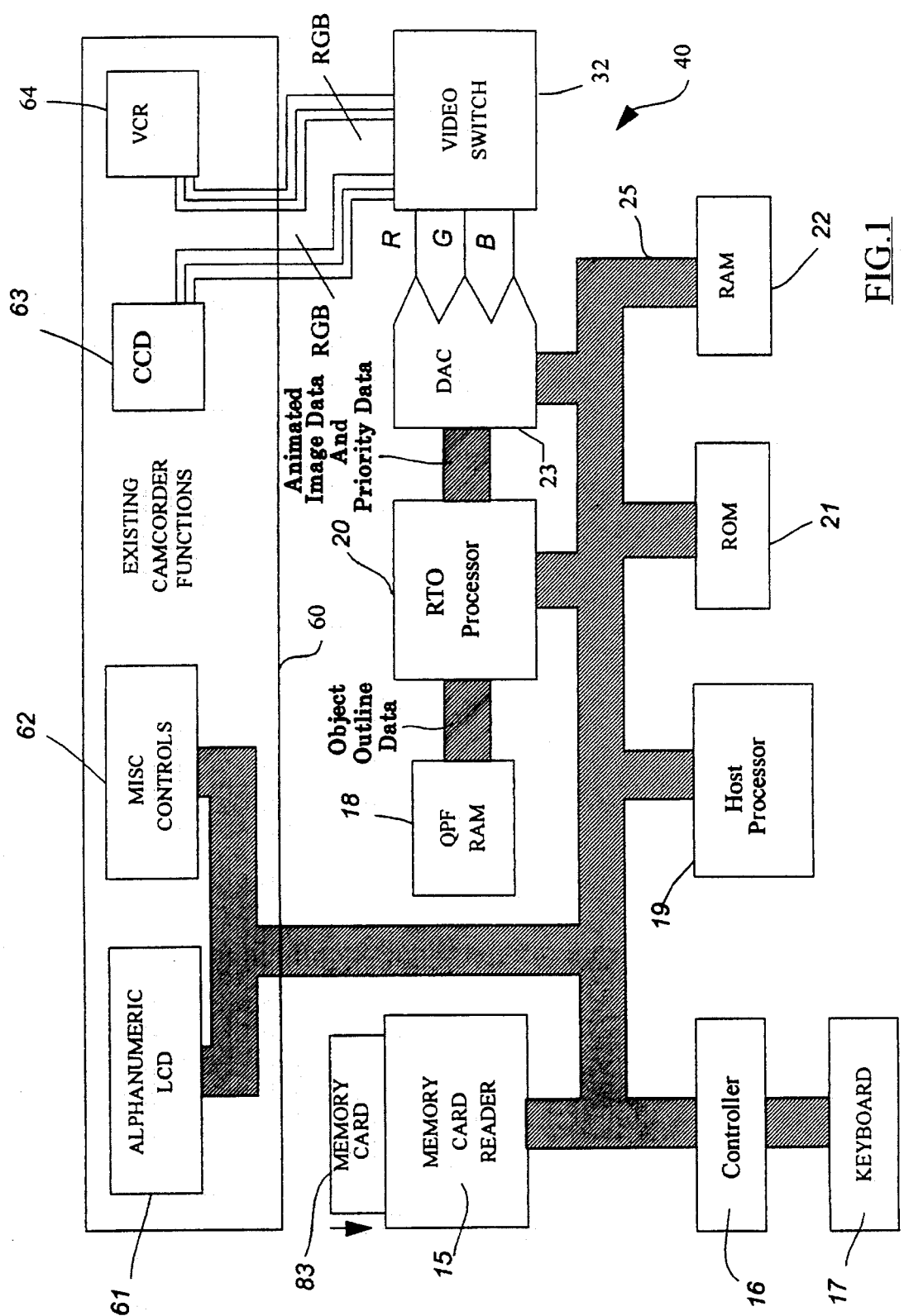
FIG. 1 is a schematic block diagram of the circuitry of the preferred embodiment.
Figure 2:
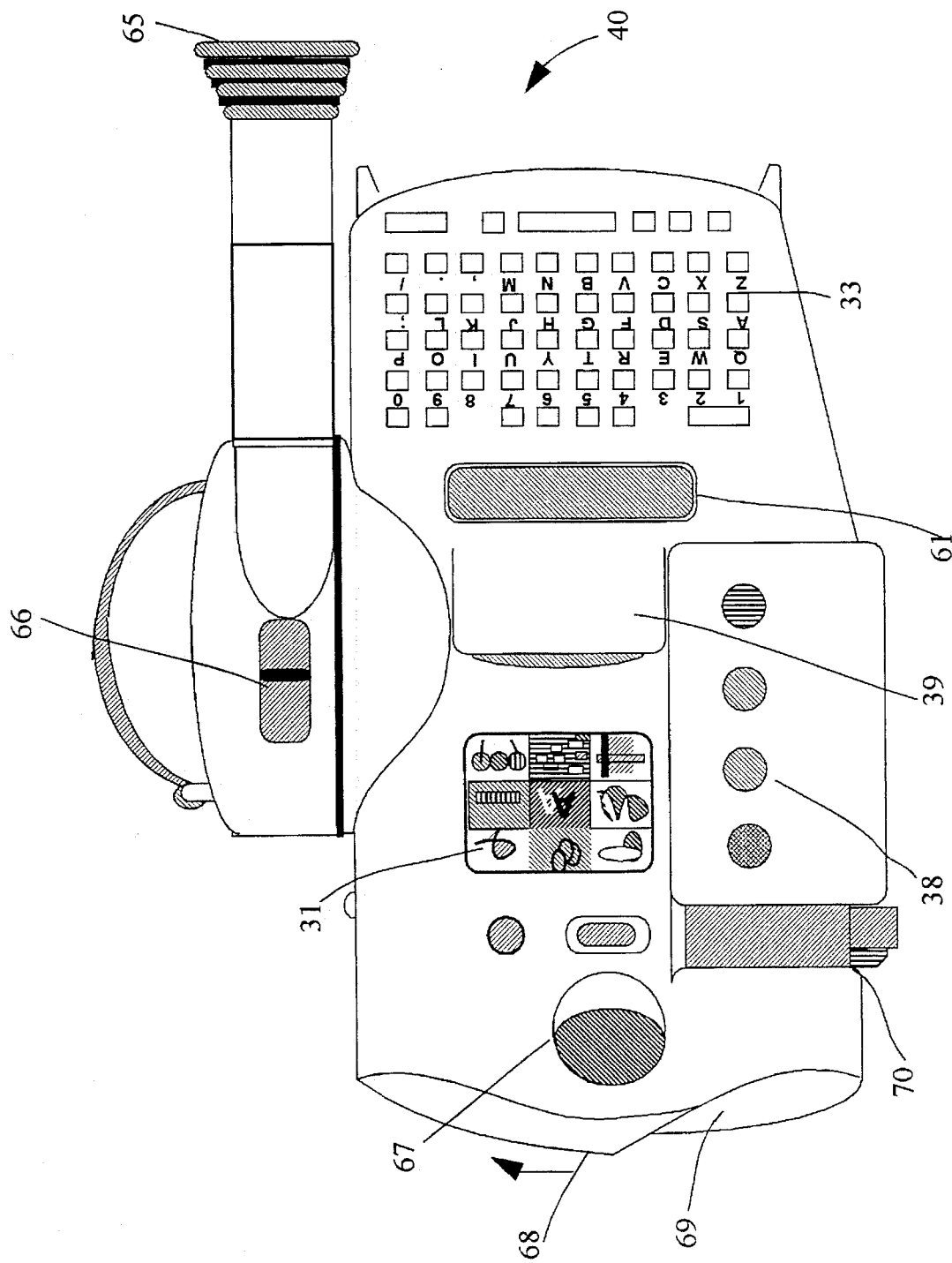
FIG. 2 is a side elevation of the preferred embodiment.

In FIG. 1, the circuitry of the preferred embodiment which is a camcorder system is illustrated. The circuitry 40 includes known camcorder functions 60 and additional animation based devices. The existing camcorder functions 60 include an alpha-numeric liquid crystal display (LCD) 61 and various miscellaneous controls 62 such as an auto zoom controller 66, and a manual zoom control 70 as seen in FIG. 2. Other existing functions 60 include a charge coupled display (CCD) 63 for detecting a visual image and outputting red, green and blue (RGB) colour data. A video cassette recorder (VCR) 64 is also included which acts to record video information in the known manner.

In a standard camcorder, the CCD 63 and VCR 64 are directly connected, however, in the preferred embodiment each are connected to a video switch 32, seen in FIG. 1. The switch 32 allows for signals from the CCD 63 to be combined with animation signals despatched from a digital to analog converter (DAC) 23. Alternatively, either signal can be outputted directly to the VCR 64 for recording.

The circuitry 40 of the system receives user input via a keyboard 17 which includes an alpha-numeric keypad 33, a touch panel 31, and animation control keys 38 (seen in FIG. 2). The keyboard 17 connects to a controller 16 which interprets commands and provide control commands onto a bus 25 which interconnects other components within the system 40. A memory card reader 15 is provided connected to the bus 25 to allow for the insertion of a pre-programmed memory card 83 which can contain system code, alterable animation sequences, sound effects, a font, and graphic objects. The touch panel 31 is located over the card reader 15 to allow for selecting a desired animation sequence.

The LCD 61 and miscellaneous controls 62 are also connected to the bus 25 and their operation is controlled by a pre-programmed read-only memory (ROM) 21, which acts for system control and boot up. A host processor 19 is provided to generate and update object based animation data units in a RAM 22 for each video field. This must be done 60 times per second for NTSC systems and 50 times per second for PAL systems. Various animation forms can be achieved in real-time, including moving of objects on arbitrary paths, smoothly enlarging or reducing objects, and changing the colour and shape of objects.

Preferably, the processor 19 is an i960SB processor capable of executing more than four million instructions per second. Generally however, the processor 19 is not capable for calculating pixel data for animated images where the required rate of calculation is approximately 13.33 million pixels per second. This function is provided in a real-time object (RTO) processor 20.

The RTO processor 20 reads object lists from the RAM 22 and operates in real-time, rendering the outline information with the use of a dedicated quadratic polynomial fragment (QPF) RAM 18. The RTO processor 20 calculates outline intersections with every scanned line, re-sorts the outlines if any should cross over, and determines the viewing object priority. This priority determines which object is on top for each section of a scanned line. The object priorities are output in real-time at a resolution of 720 pixels per line. This information is then passed to a colour look-up table included within the DAC 23 which assigns a colour to each object level. This colour can be any of 16 million colours in a digital video palette. This output can be either RGB as shown illustrated, or YUV, in CCIR601 4:4:4 format. The DAC 23 can, for example, be a standard 478 type RAM DAC.

There is also a "special" object colour. This "colour" selects the video input from the CCD 63. As this "colour" can be animated in exactly the same way as other colours, the system 40 is capable of fully animated video wipes and keys. These wipes can be between the CCD 63 image and graphics, or between a fade of the CCD 63 image and graphics.

Figure 3:
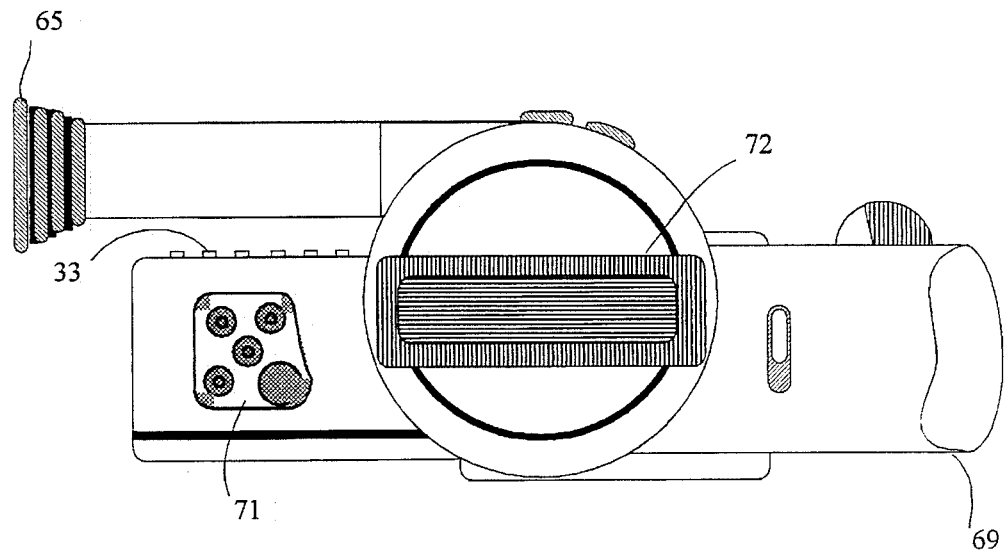
FIG. 3 is a plan view of the preferred embodiment.
Figure 4:
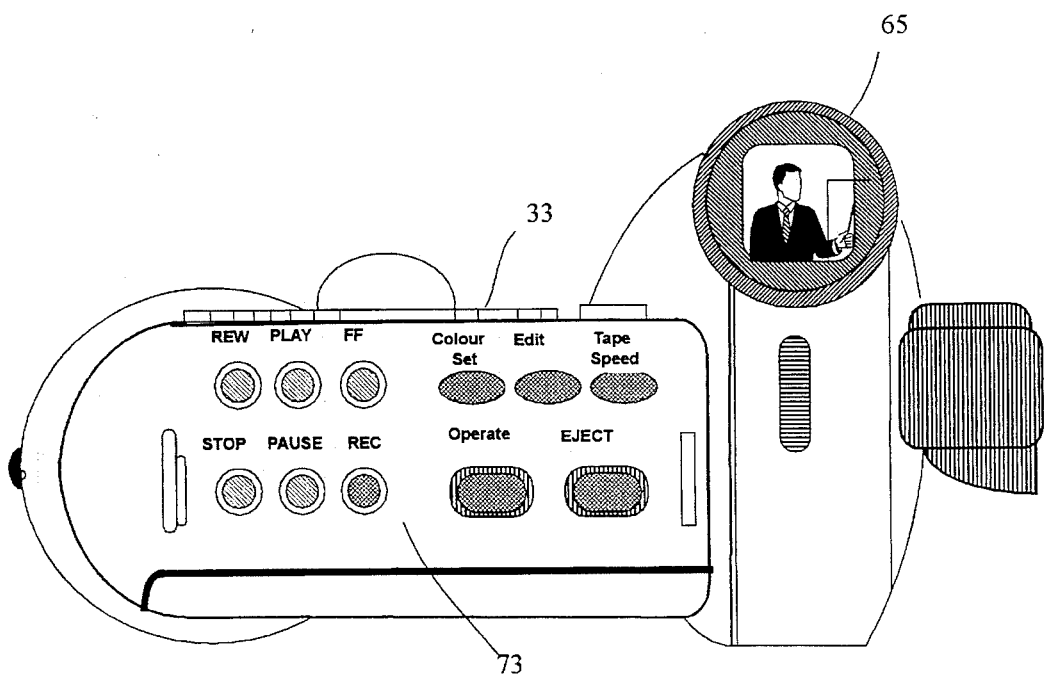
FIG. 4 is an inverted plan view of the preferred embodiment.

Referring to FIGS. 2–4, the camcorder is shown including other standard components such as view finder 65, the auto zoom controller 66, a microphone 67, a sliding lens cover 68, a lens 69, the manual zoom controller 70, an input/output panel 71, a carry handle 72 and the normal camcorder buttons 73. Also shown is a number of animation controls 38 which comprise OVER, IN, OUT and GO buttons. An insertion slot 39 is provided for the memory card 83.

The controls 38 provide for alterable animation which provides a number of primary features including real-time animation at full television resolution, pre-constructed animations which can be customised by the user, smooth colour transitions, real-time video wipes, animation over live video, high quality titling capability including many effects and animations, animatable business graphics and complex video transitions without extra equipment.

Alterable animation is a new concept for consumer video. It is a combination of preformatted animations created by expert animators, text entered by the user, various user choices, sound effects, and the user's video images.

The camcorder of the preferred embodiment can be operated in the following way:

1. One of the nine alterable animations on the memory card is selected by pressing on the touch sensitive panel over the picture of the desired animation.
2. Any text required is typed in on the alphanumeric keyboard.
3. Any "canned" graphics required is selected.
4. OVER, IN or OUT animation type is selected by pressing the corresponding button, and
5. As the video is being recorded, the GO button is pressed.

Each alterable animation contains three animations types: OVER, IN and OUT. These allow sophisticated video sequences to be assembled using the circuitry 40 alone, with no extra equipment. This currently requires more than US$200,000 of professional video equipment to produce, and much skill and time.

An OVER sequence produces animation, including titles, which appears superimposed over the live video. Both the start and the end of the animation sequence leave the video image as 100% video, with no animation superimposed.

An OUT animation sequence "fades" out the live video to a still image. This out sequence can happen in many ways, but the basic principle is that the live video is progressively obscured until the image becomes 100% graphics.

An IN animation sequence leads into the live video from a still image.

An OUT and an IN sequence combine to provide a sophisticated transition from one video shot to the next. This is because an OUT always ends in a computer generated still image. The corresponding IN starts from the same computer generated still. Therefore, video recording can be stopped after an OUT and a new shot can be set up. The new shot is started with the corresponding IN, generated by the computer, resulting in complete video continuity.

The foregoing describes only one embodiment of the present invention and modifications, obvious to those skilled in the art can be made thereto without departing from the scope of the present invention.

We claim:

1. A video camera/recorder comprising:

camera means for providing a real-time image signal;

input means for receiving animation image data representing at least one animated image;

processing means for selecting at least one animated image from the animation image data;

real-time processor means connected to said processing means for calculating object priorities for the selected animated image;

video switch means connected to said real-time processor means for combining the real-time image signal with the selected animated image in accordance with the object priorities to form a combined real-time image signal; and recorder means for recording the combined real-time image signal.

2. A video camera/recorder as claimed in claim 1, wherein said animated image is composed from quadratic polynomial fragment data.

3. A video camera/recorder as claimed in claim 1, wherein said input means includes a memory storage housing means adapted to receive a detachable memory storage device containing object image data.

4. A video camera/recorder as claimed in claim 3, wherein said detachable memory storage device is a non-volatile memory card.

5. A video camera/recorder as claimed in claim 4, wherein said memory storage device includes system code used in operation of said video camera/recorder.

6. A video camera/recorder as claimed in claim 1, wherein said processing means includes a host processing means comprising a microprocessor having an execution speed greater than 4 million instructions per second.

7. A video camera/recorder as claimed in claim 1, wherein said video camera/recorder is packaged within a hand-held unit.

8. A video camera/recorder as claimed in claim 1, further comprising user input means connected to said processing means, said user input means including an over sequence signal input means for providing animation over live video.

9. A video camera/recorder as claimed in claim 1, further comprising user input means connected to said processing means and including an out signal input means for providing fading of live video to full animation image data.

10. A video camera/recorder as claimed in claim 1, further comprising user input means connected to said processing means and including an in signal input means for providing fading of full animation image data to live video.

11. A video camera/recorder comprising:

camera means for providing a real-time image signal;

input means for receiving animation image data, the animation image data including object outline data representing at least one animated image;

processing means for selecting at least one animated image from the animation image data;

real-time processor means connected to said processing means for generating processed animated image data from the object outline data of the selected animated image;

video switch means connected to said real-time processor means for combining the real-time image signal with the processed animated image data to form a combined real-time image signal; and recorder means for recording the combined real-time image signal.

12. A video camera/recorder as claimed in claim 11, wherein said object outline data includes quadratic polynomial fragment data.

13. A video camera/recorder as claimed in claim 11, wherein said input means includes a memory storage housing means adapted to receive a detachable memory storage device containing object image data.

14. A video camera/recorder as claimed in claim 13, wherein said detachable memory storage device is a non-volatile memory card.

15. A video camera/recorder as claimed in claim 14, wherein said memory storage device includes system code used in operation of said video camera/recorder.

16. A video camera/recorder as claimed in claim 11, wherein said processing means includes a host processing means comprising a microprocessor having an execution speed greater than 4 million instructions per second.

17. A video camera/recorder as claimed in claim 11, wherein said video camera/recorder is packaged within a hand-held unit.

18. A video camera/recorder as claimed in claim 11, further comprising user input means connected to said processing means, said user input means including an over sequence signal input means for providing animation over live video.

19. A video camera/recorder as claimed in claim 11, further comprising user input means connected to said processing means and including an out signal input means for providing fading of live video to full animation image data.

20. A video camera/recorder as claimed in claim 1, further comprising user input means connected to said processing means and including an in signal input means for providing fading of full animation image data to live video.

21. A video camera/recorder comprising:

camera means for providing a real-time image signal;

input means for receiving image data representing at least one image;

processing means for selecting at least one image from the image data;

real-time processor means connected to said processing means for calculating object priorities for the selected image;

combining means connected to said real-time processor means for combining the real-time image signal with the selected image in accordance with the object priorities to form a combined real-time image signal; and recorder means for recording the combined real-time image signal.

22. A video camera/recorder comprising:

camera means for providing a real-time image signal;

input means for receiving image data, said image data including object outline data representing at least one image;

processing means for selecting at least one image from the image data;

real-time processor means connected to said processing means for generating processed image data from the object outline data of the selected image;

combining means connected to said real-time processor means for combining the real-time image signal with the processed image data to form a combined real-time image signal; and recorder means for recording the combined real-time image signal.

23. A video signal processor apparatus comprising:

image signal generating means for generating a real-time image signal;

input means for receiving image data representing at least one image;

processing means for selecting at least one image from the image data;

real-time processor means connected to said processing means for calculating object priorities for the selected image; and combining means connected to said real-time processor means for combining the real-time image signal with the selected image in accordance with the object priorities to form a combined real-time image signal.

24. A video signal processor apparatus comprising:

image signal generating means for generating a real-time image signal;

input means for receiving image data, said image data including object outline data representing at least one image;

processing means for selecting at least one image from the image data; and real-time processor means connected to said processing means for generating processed image data from the object outline data of the selected image; and combining means connected to said real-time processor means for combining the real-time image signal with the processed image data to form a combined real-time image signal.

* * * * *

UNITED STATES PATENT AND TRADEMARK OFFICE
CERTIFICATE OF CORRECTION

PATENT NO. : 5,479,205
DATED : December 26, 1995
INVENTOR(S) : Silverbrook

It is certified that error appears in the above-indentified patent and that said Letters Patent is hereby corrected as shown below:

COLUMN 1

```
Line 7,  "FIELD" should read --¶ FIELD--.
Line 18, "dam," should read --data,--.
Line 23, "render" should read --rendered--.
Line 37, "ment;" should read --ment.--.
Line 49, "No. 38270/93" should read
         --No. 38240/93--.
```

COLUMN 2

```
Line 8,  "U.S. patent" should be deleted.
Lines 9 through 20 should be deleted.
Line 31, "outputing" should read --outputting--.
Line 46, "provide" should read --provides--.
```

UNITED STATES PATENT AND TRADEMARK OFFICE
CERTIFICATE OF CORRECTION

PATENT NO. : 5,479,205
DATED : December 26, 1995
INVENTOR(S) : Silverbrook

It is certified that error appears in the above-indentified patent and that said Letters Patent is hereby corrected as shown below:

COLUMN 3

Line 4, "processor 20." should read --processor 20. A full description of an RTO processor suitable for use with the present embodiment is given in the aforementioned Australian patent Application No. 38244/93.--.

COLUMN 6

Line 50, "and" should be deleted.

Signed and Sealed this

First Day of October, 1996

Attest:

BRUCE LEHMAN

Attesting Officer     Commissioner of Patents and Trademarks